United States Patent Office 2,798,991
Patented July 9, 1957

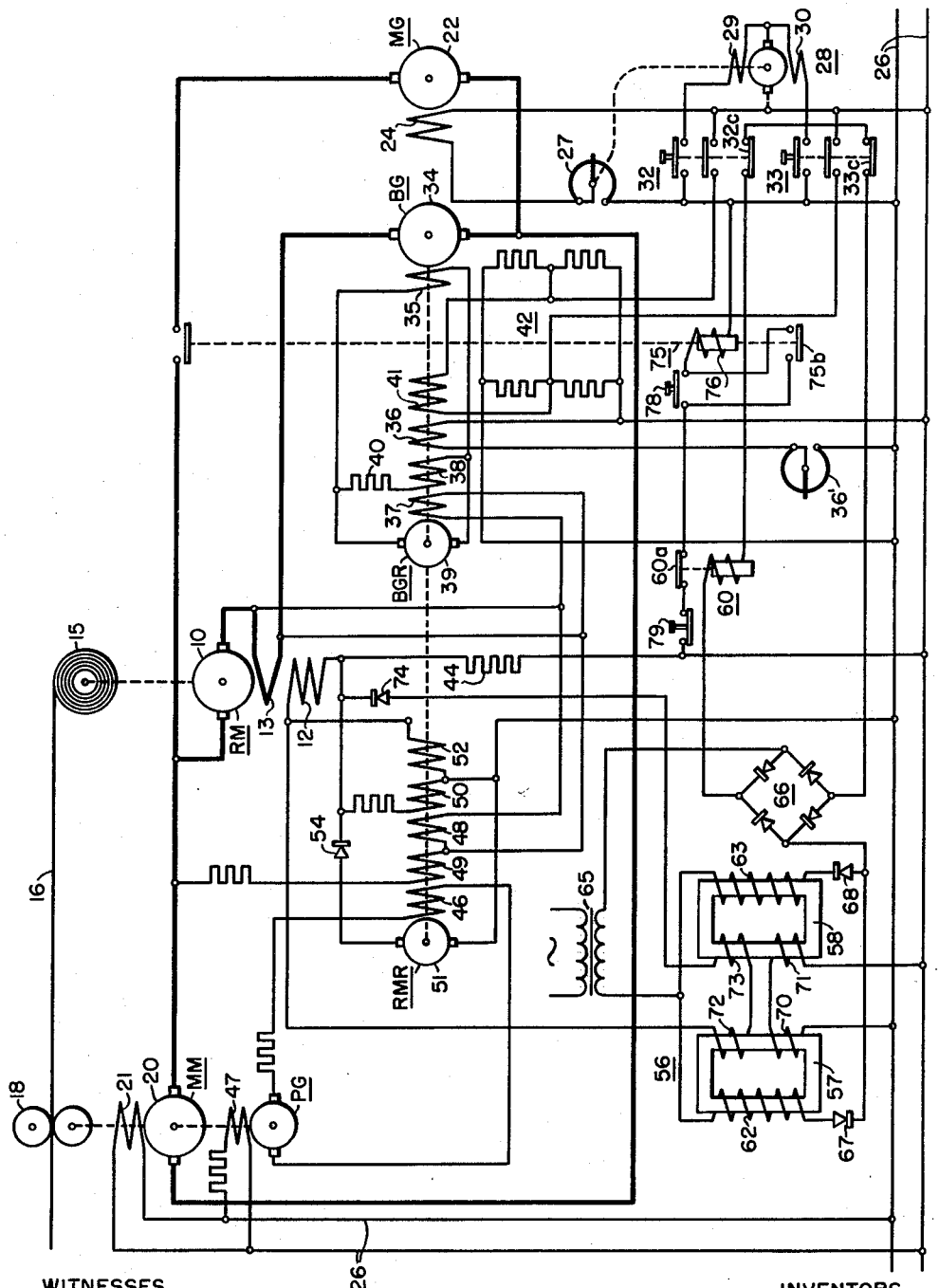

2,798,991

REEL MOTOR CONTROL SYSTEMS

Amos J. Winchester, Jr., Pittsburgh, and Sylvester J. Campbell, North Braddock, Pa., assignors to Westinghouse Electric Corporation, East Pittsburgh, Pa., a corporation of Pennsylvania Application January 21, 1954, Serial No. 405,357

8 Claims. (Cl. 318—6)

Our invention relates generally to motor control systems and it has reference, in particular, to control systems for motors connected in driving relation with a reel for handling a strip of material or the like.

Generally stated, it is an object of our invention to provide an improved reel motor control system with provision for automatically stopping the motor in the event of strip breakage.

More specifically, it is an object of our invention to provide for using the stored energy of the field winding of a reel motor for operating an emergency stop relay to stop the motor in the event of breakage of a strip of material being wound on the reel.

It is also an object of our invention to provide in a control system for a reel motor for using a magnetic amplifier responsive to the reactance voltage of the reel motor field winding in one direction for effecting stoppage of the motor.

Yet another object of our invention is to provide for using the stored energy of a reel motor field winding for operating an emergency stop relay to stop the motor in the event of strip breakage and for interlocking the stop relay with the accelerating control for the motor so as to prevent stoppage of the motor during controlled acceleration.

It is an important object of our invention to provide for connecting a magnetic amplifier in a unidirectional circuit with the field winding of a reel motor for effecting stoppage of the motor in response to a self-induced voltage in the field winding when the excitation thereof is abruptly reduced.

Other objects will, in part, be obvious and will, in part, be explained hereafter.

In accordance with the teachings of our invention, a reel motor having a driving connection with a reel for winding a strip of material proceeding from a mill stand, is supplied with electrical energy from a common generator also supplying electrical energy to the armature of the mill motor. A booster generator is connected in circuit with the armature of the reel motor and is controlled by a regulating generator to maintain a constant value of armature current. The field winding of the reel motor is supplied with a minimum value of field excitation from a control circuit, and a regulating generator is provided for varying this excitation to maintain a predetermined value of counterelectromotive force for a given speed of the mill motor. A magnetic amplifier for controlling an emergency stop relay for effecting disconnection of the motors from the common generator has its control winding connected across the field winding of the reel motor in circuit with a rectifier, so as to be energized by the reactance voltage of the winding when the field excitation thereof is abruptly reduced by its regulating generator upon a breakage of the strip.

For a more complete understanding of the nature and scope of our invention, reference may be made to the following detailed description which may be read in connection with the accompanying drawing, in which the single figure is a diagrammatic view of a reel drive embodying the invention in one of its forms.

Referring to the single figure of the drawing, a reel motor RM, having an armature 10, a main field winding 12 and a series commutating field winding 13, is connected in driving relation with a reel 15 for winding a strip of material 16 which is proceeding from the rolls 18 of a work device such as a mill stand, which is driven by a mill motor MM having an armature 20 and a field winding 21.

The armatures 10 and 20 are supplied with electrical energy from any suitable source, such as, for example, a main generator MG having an armature 22 connected in circuit relation with the armatures 10 and 20, and provided with a field winding 24. The field winding 24 is connected to a suitable source of excitation represented by the conductors 26, through a field rheostat 27 provided with a motor 28 having oppositely disposed field windings 29 and 30 disposed to be connected to the conductors 26 through "raise" and "lower" push-button switches 32 and 33, for operating the rheostat 27 to increase and decrease the excitation of the field winding 24, and thus raise and lower the output voltage of the generator MG.

A booster generator BG has the armature 34 thereof connected in series circuit relation with the armature 10 of the reel motor, and is provided with a field winding 35 disposed to be energized under the control of a booster regulating generator BGR to regulate for a constant value of reel motor armature current. The regulating generator BGR is provided with a pattern field winding 36 energized from the conductors 26 through a field rheostat 36' for determining the value of current to be maintained. A differential control winding 37 is connected across the commutating field winding 13 so as to be energized in accordance with the armature current of the reel motor, while an antihunt field winding 38 is connected across the armature 39 of the regulating generator in series with a suitable resistor 40. The regulating generator is also provided with an inertia compensating winding 41 connected to a resistor bridge circuit 42 for reversible energization in accordance with operation of the "raise" and the "lower" push-button switches 32 and 33 to vary the effective value of the pattern field winding during acceleration and deceleration of the mill.

The field winding 12 of the reel motor is connected to the conductors 26 through a current limiting resistor 44 to provide a minimum value of field excitation for determining the maximum speed of the reel motor. A reel motor regulating generator RMR is provided for varying the excitation of the winding 12 to maintain a predetermined value of counterelectromotive force relative to the speed of the mill motor. The regulating generator RMR is provided with a pattern field winding 46 connected to a pilot generator PG driven by the mill motor MM and having a field winding 47 energized from the conductors 26 so as to provide a voltage proportional to the speed of the mill stand. The regulating generator RMR is provided with current and voltage field windings 48 and 49 so arranged as to produce an excitation opposing that of the pattern field winding, which excitation is proportional to the counterelectromotive force of the reel motor. An anti-hunt field winding 50 is connected in shunt with the armature 51 while a self-energizing type of field winding 52 is connected in series with the armature 51 and the field winding 12. A rectifier device 54 of the dry type is connected between the armature 51 and the field winding 12, so as to provide for only cumulative energization of the field winding 12 with respect to the excitation received from the conductor 26."

In order to provide for stopping the reel motor and the mill motor in the event of breakage of the strip 16, advantage is taken of the fact that when the strip breaks and the reel motor regulating generator RMR attempts to quickly reduced the excitation of the field winding 12, a self-induced or reactance voltage is developed across winding 12 in a direction to maintain the current flow therethrough in the same direction as previously. A magnetic amplifier 56 comprising a pair of magnetic core members 57 and 58 for controlling the operation of an emergency "stop" relay 60, is used to respond to this reactance voltage. The magnetic amplifier 56 is provided with reactance windings 62 and 63 connected in parallel with each other between the terminals of a transformer 65 and the input terminals of a rectifier bridge circuit 66. Oppositely disposed rectifiers 67 and 68 are connected in series with the reactance windings for producing self-saturation of the core members 57 and 58, respectively, on opposite half-cycles of the alternating current. The "stop" relay 60 is connected across the output terminals of the bridge circuit 66. Bias windings 70 and 71 are provided on the core members 57 and 58 for producing a bias magnetization cumulative with respect to that of the respective reactance windings. The control windings 72 and 73 are connected in series with each other and across the field winding 12 in series with a rectifier device 74 for producing a magnetic flux in opposition to that of the bias windings when the excitation of the field winding is suddenly reduced, for rendering the magnetic amplifier conductive to effect energization of the stop relay 60.

The main generator MG is connected to the reel motor and the mill motor through a suitable line switch or contactor 75 having an operating winding 76. The operating winding 76 is connected across the conductors 26 through a "start" push-button switch 78 and a "stop" push-button switch 79, the switch 75 being provided with a holding contact member 75b for shunting the "start" switch. By connecting the contact member 60a of the "stop" relay in series with the operating winding 76, operation of the "stop" relay 60 will effect deenergization of the switch 75. The operating circuit for the "stop" relay 60 is connected through contact members 32c and 33c of the "raise" and "lower" push-button switches, so as to render the "stop" relay ineffective during acceleration and deceleration of the apparatus through operation of the rheostat motor 28.

In normal operation, the speeds of the reel motor and the mill motor may be generally determined by the position of the generator rheostat 27. Operation of this rheostat to change the speed of the mill effects interruption of the energizing circuit for the "stop" relay 60, so that the magnetic amplifier will be ineffective to disconnect the main generator from the motors under such conditions.

During normal operation of the apparatus, the voltage of the booster generator is regulated by the booster generator regulating generator BGR to maintain a substantially constant value of reel motor armature current. Compensation for coil buildup as the diameter of the coil on the reel increases is effected by the reel motor regulating generator RMR, which will normally progressively increase the excitation of the field winding 12 to maintain a predetermined value of counterelectromotive force to match the output of the pilot generator PG.

Should the strip 16 break, the reel motor regulating generator will immediately reduce the excitation of the field winding 12 in order to try and speed up the reel motor and increase its counterelectromotive force to restore strip tension. With a rapid reduction in the excitation of the field winding 12, a self-induced reactance voltage appears across the winding in a direction to maintain the current therethrough in the same direction as previously. This voltage will be in a direction to force current through the control windings 72 and 73 and their associated rectifier 74, thus rendering the magnetic amplifier 56 conductive. The "stop" relay 60 will thereupon be energized, interrupting the circuit for the line switch 75, which opens and disconnects the reel motor RM and the mill motor MM from the main generator MG. Dynamic braking may be utilized in the manner well known in the art, if desired, to bring the motors to a rapid stop.

From the above description and the accompanying drawing, it will be apparent that we have provided in a simple and effective manner for stopping a reel motor in the event of strip breakage. A control system embodying the features of our invention requires the addition of but little apparatus to the standard control, and such apparatus may be of a reliable and inexpensive type comprising a magnetic amplifier and associated standard relay of any suitable type. Our invention may be readily applied to reel systems which are already in service, with a minimum of change and expense.

Since certain changes may be made in the above described construction, and different embodiments of the invention may be made without departing from the spirit and scope thereof, it is intended that all the matter shown in the accompanying drawings and described shall be considered as illustrative and not in a limiting sense.

We claim as our invention:

1. A reel drive comprising, a motor having an armature and a field winding, a switch for connecting the armature to a source of electrical energy, tension regulating means connected to respond to the counter electromotive force of the motor for controlling energization of the field winding to compensate for the effects of coil build-up, and control means connected across the field winding to be responsive to a predetermined value of reactance voltage from the field winding upon a sudden reduction in the energization thereof for rendering the switch inoperative.

2. In a control system for a reel motor having an armature and a field winding, switch means operable to connect the armature to a source of electrical energy, regulating means operable in response to the counter electromotive force of the motor to control energization of the field winding to compensate for changes in torque due to coil build-up, relay means operable to render the switch means inoperative, and unidirectional means connecting the relay means across the field winding to respond to the reactance voltage of said winding upon a predetermined reduction in energization thereof.

3. In a control system for a reel motor having an armature and a field winding, variable voltage generating means, switch means for connecting the armature to the variable voltage generating means, circuit means including an impedance connecting the field winding to a source of electrical energy for a predetermined minimum level of energization, regulating means responsive to the counter electromotive force of the motor for regulating the energization of said winding above said level in accordance with a difference between the counter electromotive force and a reference quantity for maintaining a predetermined counter electromotive force, control means for effecting operation of the switch means to disconnect the armature from the generating means, and rectifier means so connecting the control means to the field winding as to respond to a reactance voltage therefrom upon a sudden reduction in voltage applied to the field winding.

4. In a reel drive, a reel motor having an armature and a field winding, means including a switch connecting the armature to a variable voltage source, circuit means including a resistor connecting the field winding to a source of electrical energy to provide a predetermined minimum energization thereof, regulating means responsive to the counter electromotive force of the motor connected in shunt with said winding for varying the energization of the winding above said level in response to changes in the counter electromotive force of the motor to compensate for coil build-up on the reel, and control means operable to render said switch inoperative including an amplifier responsive to a reactance voltage appearing in a predetermined direction across the field winding upon a sudden change in energization of said winding.

5. A reel drive comprising, a motor having an armature connected to drive a reel for winding a strip of material and having a field winding, means for supplying voltage to the armature, regulating means responsive to both the speed of a work device and the counter electromotive force of the motor for controlling the energization of the field winding to match the counterelectromotive force of the motor with the speed of a work device supplying the strip of material to the reel, control means operable to remove voltage from the armature including a magnetic amplifier having a control winding, and circuit means including a rectifier connecting the control winding across the field winding for energization only in response to a reactance voltage induced therein when the energization of the field winding is suddenly reduced.

6. In a reel drive, a reel motor having a field winding and an armature connected in driving relation with a reel for handling a strip of material, a switch operable to connect the armature to a variable voltage source, means including an impedance connecting the field winding to a source of electrical energy to provide a minimum value of field excitation, a regulator operable in response to a difference between the counter electromotive force of the motor and the speed of a machine supplying the strip to vary the excitation of the field winding above said value to maintain a predetermined relation between the counterelectromotive force of the motor and the speed of the machine, a control relay operable to render the switch inoperative, a magnetic amplifier for controlling said relay, said magnetic amplifier having a control winding, and circuit means including a rectifier connecting the control winding in shunt with the field winding for energization by a reactance voltage thereof when the regulator attempts to rapidly reduce the excitation of the field winding.

7. A reel drive comprising, a motor having an armature disposed to be connected to a reel for winding a strip of material, switch means for connecting the armature to a generator for effecting energization of the armature, regulating means responsive to the armature current of the motor normally regulating the voltage applied to the armature to maintain a constant value of armature current, additional regulating means responsive to a differential between the counterelectromotive force of the motor and a reference quantity for controlling the energization of the field winding to compensate for coil build-up, control means responsive to a predetermined value of reactance voltage across the field winding upon a change in the energization of the winding for rendering the switch means inoperative, and means for changing the voltage of the generator and rendering the control means nonresponsive.

8. A reel drive comprising, a motor having a field winding and an armature connected in driving relation with a reel for winding a strip of material, a second motor having an armature connected in driving relation with a work device supplying strip to the reel, a generator connected to supply electrical energy to both of said armatures, regulating means responsive to the reel motor armature current for maintaining a substantially constant value of armature current for the reel motor, means for producing a voltage responsive to the speed of the work device, regulating means responsive to a difference between said voltage and the counterelectromotive force of the reel motor for controlling the excitation of the reel motor field winding to maintain a predetermined relation therebetween, means for effecting disconnection of the generator from the reel motor, control means connected in circuit relation with the field winding for energization by a reactance voltage when the excitation of the field winding is suddenly reduced to effect operation of said disconnection means, and means for varying the voltage of the generator and rendering the control means ineffective.

References Cited in the file of this patent

UNITED STATES PATENTS

| | | |
|---|---|---|
| 2,437,973 | Schmitz | Mar. 16, 1948 |
| 2,512,378 | Puchlowski | June 20, 1950 |